United States Patent Office 3,232,674
Patented Feb. 1, 1966

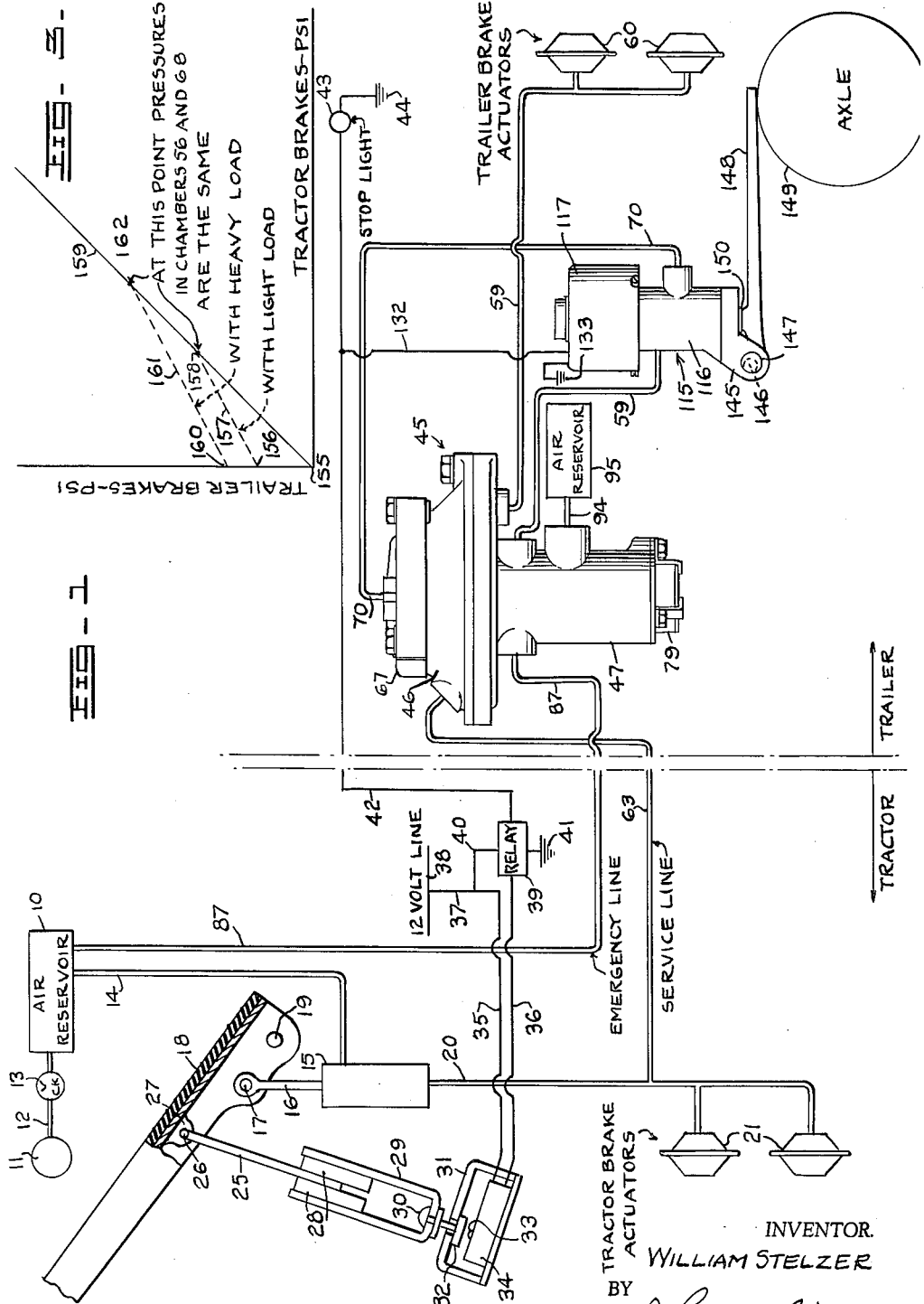

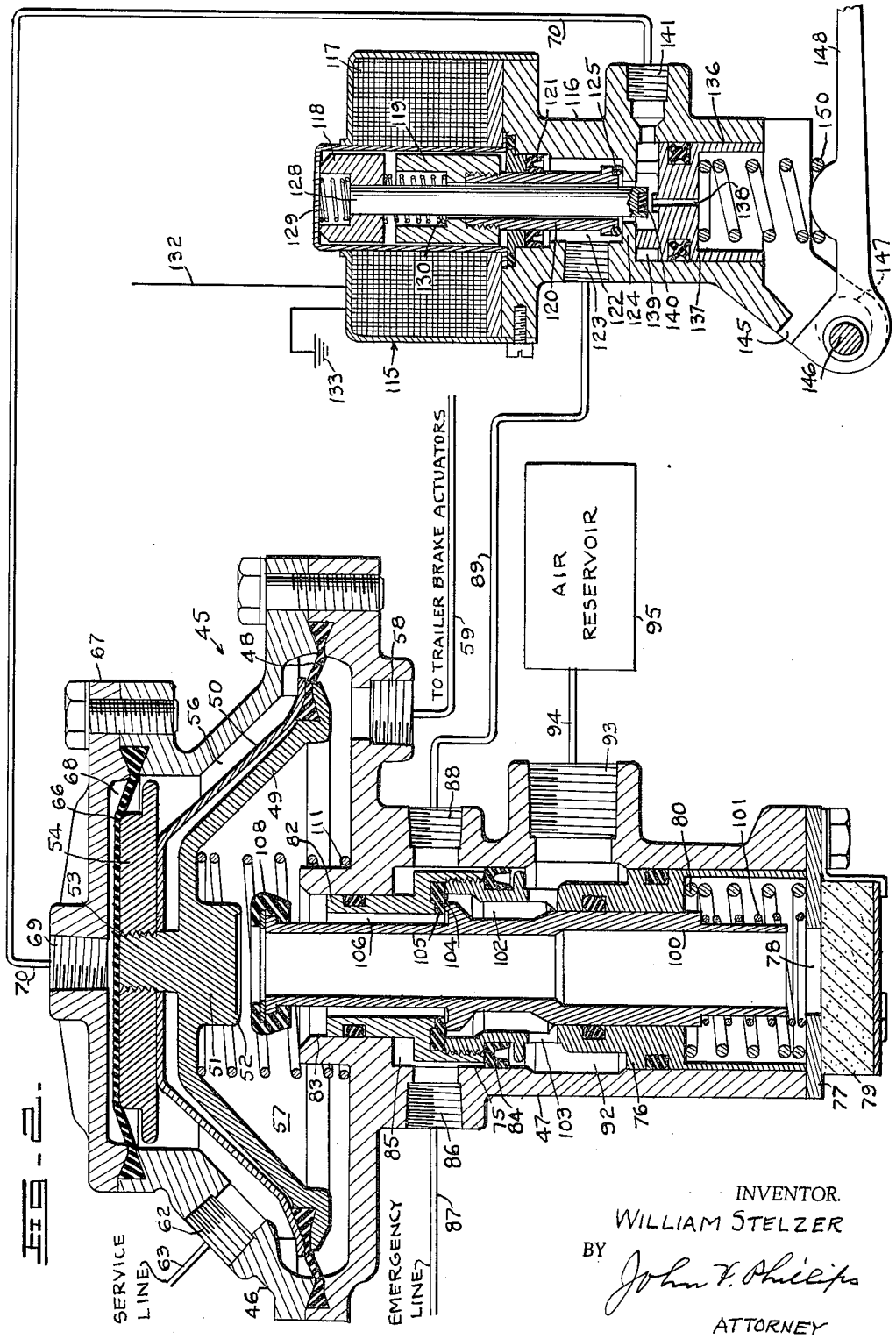

3,232,674
TRACTOR TRAILER BRAKE SYSTEM
William Stelzer, Bloomfield Hills, Mich., assignor to Kelsey-Hayes Company, Romulus, Mich., a corporation of Delaware
Filed Feb. 13, 1963, Ser. No. 258,334
8 Claims. (Cl. 303—7)

This invention relates to tractor trailer brake systems and is an improvement over the system shown in my co-pending application Serial No. 250,370, filed January 9, 1963.

In my co-pending application referred to above, I have shown a system wherein an emergency relay valve mechanism for controlling the tractor brakes operates in combination with the electrically controlled means which supplies fluid pressure to the trailer brakes upon initial movement of the brake pedal so as to provide a snubbing action and thus prevent jacknifing. The system also includes load control means for predetermining the degree of trailer brake operation in accordance with the loading of the vehicle, and the system so functions that when service line pressures build up in the relay valve mechanism to the proper point, such pressure takes over the controlling of the emergency relay valve mechanism.

An important object of the present invention is to incorporate the advantages of the above-referred-to system in which the construction is greatly simplified.

A further object is to provide such a system wherein the energization of the electrically operated means for initially controlling the relay valve is accomplished without the use of a separate wire extending from the tractor to the trailer, the energization of the trailer stop light circuit being employed for this purpose.

A further object is to provide a novel electrically operated device for the purpose stated, in the form of a single solenoid having two armatures operable upon energization of the solenoid to respectively open a pressure valve and close an exhaust valve to effect operation of the emergency valve mechanism.

A further object is to provide simplified means associated with the relay valve for operating it to snub the trailer brakes immediately upon operation of the brake treadle, and to provide novel means for charging the air reservoir on the trailer from the air reservoir on the tractor by utilizing a part of the relay valve for such purpose.

Other objects and advantages of the invention will become apparent during the course of the following description.

In the drawings I have shown one embodiment of the invention. In this showing

FIGURE 1 is a diagrammatic view of the system as a whole, parts being shown structurally;

FIGURE 2 is an axial sectional view through the relay valve and the control parts therefor, the electrically operated valve being similarly shown; and FIGURE 3 is a graph representing relative pressures in the tractor and trailer brake actuators under different conditions.

Referring to FIGURE 1, the numeral 10 designates an air reservoir maintained charged at super-atmospheric pressure from a condensor 11 through a line 12 having the usual check valve 13 therein. An outlet pipe 14 from the reservoir is connected to a control valve mechanism diagrammatically indicated at 15 and operated by a rod 16 pivoted as at 17 to the brake treadle 18 located in the cab of the tractor. The treadle is pivoted as at 19 and when depressed, the valve mechanism 15 provides communication between the line 14 and lines 20 leading to the tractor brake actuators 21 of conventional type. The valve mechanism 15 may be of any well-known type which supplies pressure to the line 20 in accordance with the extent of depression of the brake treadle 18.

A switch device is operable by the treadle 18 for energizing the electrically controlled mechanism of the present system, as will become apparent below. This switch device may be of any desired type and is illustrated in the present case as being of the same type shown in my co-pending application referred to, and forms per se no part of the present invention. A plate 25 has transverse trunnions 26 at its upper end to be pivoted to ears 27 carried by the treadle 18. The plate 25 operates in engagement with friction shoes 28 carried by the arms of a yoke 29 to the base of which is connected an operating stem 30 projecting through a switch casing 31 and provided at its lower end with a head 32 engageable immediately upon operation of the treadle 18 with the button 33 of a micro-switch 34 having wires 35 and 36 connected thereto.

The wire 35 is connected as at 37 to the 12-volt line 38 of the tractor, while the wire 36 is connected to a relay 39 which may be similar to a horn relay. This relay is connected as at 40 to the wire 37 and is provided with the usual ground 41. A wire 42 is connected between the relay 39 and the trailer stop light 43, grounded as at 44. It will become apparent that upon initial operation of the treadle, the stop light circuit will be energized and energization of such circuit is utilized to operate the electrical means associated with the present invention, thus eliminating the necessity for a separate wire from the tractor to the trailer for this purpose.

The novel relay valve and the elements associated therewith have been indicated as a whole by the numeral 45 and have been illustrated in detail in FIGURE 2. This valve mechanism comprises upper and lower body sections 46 and 47 having clamped therebetween the periphery of a diaphragm 48. The inner periphery of the diaphragm 48 engages a substantially frusto-conical vertically movable member 49, the diaphragm being clamped thereto by a plate 50. The body 49 is carried by an axial depending portion 51 terminating at its lower end in a valve seat 52 for a purpose to be described. Extending upwardly from the axial portion 51 is a stem 53 on which is threaded a plate 54 serving as a nut to clamp the inner periphery of the plate 50 in position. The diaphragm 48 and body 49 constitute a vertically movable structure dividing the interior of the casing sections to form an upper chamber 56 and a lower chamber 57, the latter of which is open through a port 58 to a fluid line 59 leading to the trailer brake actuators 60 (FIGURE 1). The chamber 56 communicates through a port 62 with one end of a fluid line 63. This line constitutes the service line of the system and is connected to the line 20 as shown in FIGURE 1. Service line pressure, accordingly, is always present in the chamber 56. When the brakes are not in operation, atmospheric pressure is present in both of the chambers 56 and 57 as will become apparent below.

The plate 54 is of substantial diameter as shown and acts as a backing plate for a diaphragm 66, the outer periphery of which is clamped between the top of the body 46 and a cover plate 67. The diaphragm 66 forms with the cover 67 a chamber 68 which is divided from the chamber 56 by the diaphragm 66. The chamber 68 communicates through a port 69 with one end of a pipeline 70, further described below.

The lower cylindrical portion of the body 47 is provided with a bore 75 in which is slidable a plunger 76 in sealed relation therewith. The lower end of the bore 75 is closed by a plate 77 open to the atmosphere as at 78 through an exhaust muffler 79. A spring 80 biases the piston 76 upwardly and this piston is held normally at its lowermost position by fluid pressure as described below.

An upper extension 82 of the piston 76 is threaded on the body of the latter and is vertically movable in sealed relation to a reduced bore 83. At the lower end of the piston extension 82 is arranged a lipped seal 84 which prevents the escape of pressure upwardly but permits the escape of pressure downwardly, thus serving as a check valve in a novel manner, as described below. Above the seal 84 the piston extension 82 forms with the body 47 a chamber 85 communicating at one side through a port 86 with a pipe 87 which forms the emergency line of the system and is connected to the air reservoir 10. Pressure acting downwardly in the chamber 85 maintains the lower end of the piston 76 seated against the plate 77. The chamber 85 also communicates through a port 88 with a fluid line 89, further described below.

Intermediate its ends, the piston 76 forms with the body 47 an annular chamber 92 communicating through a port 93 with a fluid line 94 leading to an air reservoir 95 on the trailer. This reservoir is maintained charged with pressure from the emergency line 87, chamber 85, downwardly past the lip of the cup 84 into the chamber 92. Any drop in pressure during operation of the trailer brakes will be replaced in the reservoir 95 by the same means.

A hollow piston or plunger 100 is vertically slidable in the piston 76 and is biased upwardly by a spring 101. Intermediate its ends, the piston 100 forms with the piston 96 an annular chamber 102 communicating with the chamber 92 through ports 103. The piston 100 carries an annular valve 104 engageable with a resilient valve seat 105 carried by the piston 76, 82. The upper portion of the piston 100 and piston extension 82 are spaced to provide an annular passage 106 communicating with the chamber 57. The upper end of the tubular piston 100 is provided with an annular valve seat 108 engageable with, but normally disengaged from, the valve 52, thus connecting the chamber 57 to the atmosphere through the piston 100. Such open position of the valve 52 is normally maintained by a spring 111 biasing the movable body 49 upwardly, pressures being normally balanced at atmospheric pressures in the chambers 56 and 57 as stated above.

The electro-magnetic control device of the present system is shown in FIGURE 2 and is indicated as a whole by the numeral 115. This device comprises a lower body 116, at the top of which is arranged a solenoid 117 having two armatures 118 and 119. The armature 119 is threaded on a depending tubular body 120 operating in a seal 121 carried by the body 116. Below such seal and around the tubular body 120 is formed a chamber 122 communicating through a port 123 with the other end of the line 89, described above. The lower end of the chamber 122 terminates in a valve seat 124 normally engaged by a resilient valve 125 carried by the lower end of the tubular member 120.

The upper armature 118 carries a depending rod 128 formed of non-magnetic material and projecting through and spaced from the valve seat 124. A light spring 129 biases the armature 118 downwardly and a spring 130 is interposed between the two armatures to bias the armature 118 upwardly and the armature 119 downwardly to tend to maintain the valve 125 closed. It will become apparent that upon energization of the solenoid 117, the armature 118 moves downwardly while the armature 119 moves upwardly to open the valve 125. One terminal of the solenoid 117 is connected by a wire 132 to the wire 42 (FIGURE 1) while the other terminal of the solenoid is grounded as at 133.

The lower part of the mechanism 115 acts as a pressure regulator. The body 116 is provided with a bore 136 in which is slidable in sealed relation therewith a piston 137 having an axial atmospheric opening 138 therethrough, the upper end of which communicates with a chamber 139 at the top of the piston 137. The piston 137 at the upper end of the air passage 138 forms a valve seat engageable with a resilient valve 140 carried by the lower end of the stem 128. This valve is normally open so that the chamber 139 communicates with the atmosphere. The chamber 139 communicates through a port 141 with the other end of the fluid line 70, described above.

The lower end of the body 116 is provided with a yoke 145 having a pivot pin 146 provided with eccentric ends 147 for connecting it to the yoke 145 so that rotation with the pin 146 varies the position of the pivot axis of the pin 146 for a purpose to be described. Particular means for fixing the eccentric 147 in position forms no part of the present invention. An arm 148 is pivoted on the pin 146 and has its free end bearing on an axle 149 of the trailer (FIGURE 1) so that the arm 148 varies its position according to the loading of the trailer. A spring 150 is interposed between the arm 148 and piston 137. The greater the loading of the trailer, the higher will be the position of the arm 148, thus increasingly loading the spring 150 to require higher pressure in the chamber 139 to effect downward movement of the piston 137 as further described below.

FIGURE 3 illustrates graphically pressure in the tractor and trailer brakes under certain selected conditions and is substantially self-explanatory. It will become apparent that from the zero point 155, upon operation of the present mechanism with a light load, pressure in the trailer brakes will increase abruptly, for example, up to the point 156. Beyond this point, pressures will increase but at a lower rate, as indicated by the line 157 until the point 158 is reached, after which pressure in the service line takes over the controlling of the relay valve and both brakes will be equally energized as indicated by the line 159. If the trailer is more heavily loaded, the operation of the mechanism causes an abrupt increase in pressure in the trailer brake actuators, for example, up to the point 160. Beyond this point, the rate of increase in pressure in the trailer brakes will be less as indicated by the line 161 until the point 162 is reached coinciding with the line 159. Beyond this point, the tractor and trailer brakes will be equally energized as before.

*Operation*

All of the parts shown in FIGURE 2 are in their normal positions, and the same is true of the treadle switch mechanism of FIGURE 1. Atmospheric pressure is present in the chamber 56 and 68. The pipeline 70 communicates with the chamber 139 of the electro-magnetic device 115. The valve 125 being closed and the valve 140 open to the atmosphere through the port 138, it is obvious that atmospheric pressure is also present in the chamber 139. The solenoid 117 will be de-energized. With the brake pedal in normal position, atmospheric pressure is present in the service line 63 which communicates with the chamber 56 (FIGURE 2) and accordingly this chamber is at atmospheric pressure, as stated above. The chamber 57 also will be at atmospheric pressure since the valve 52 will be open. The spring 111 thus biases the movable structure comprising elements 48, 49 and 54 upwardly. The emergency line 87 is always under source pressure, and since this line communicates with the chamber 85, this chamber also will be under pressure. Particular attention is invited to the fact that the lipped seal 84 acts as a downwardly opening check valve, hence pressure in the chamber 85 will be communicated to the chamber 92, and, through pipe 94, will maintain the reservoir 95 under source pressure. The valve 104 will be closed, thus disconnecting the pressure chamber 102 from the chamber 57.

The trailer brakes will be snubbed upon slight movement of the treadle 18 downwardly from its normal position. Such movement effects downward movement of the plate 25 and frictional engagement between this plate and the friction shoes 28 moves the stem 30 downwardly to push the button 33 and close the switch 34, thus energizing the relay 39 which results in energizing the circuit through the stop light wire 42, and the stop light 43, carried by the rear end of the trailer, will be illuminated.

In prior constructions using an electro-magnetic device for effecting the prompt snubbing of the trailer brakes, it has been the common practice to run a separate wire from the tractor to the trailer for this purpose. The present system utilizes the stop light wire 42 to energize the solenoid 117. Accordingly, simultaneously with the operation of the stop light 43, the solenoid 117 will be energized. The armature 118 will move downwardly to close the air valve 140, while the armature 119 will move upwardly to crack the valve 125. Pressure is always maintained in the chamber 122 from the chamber 85 through the line 89. Thus when the valve 125 is cracked, pressure will be admitted to the chamber 139 and through pipeline 70 to the chamber 68 to move the diaphragm 66 downwardly together with the elements connected thereto. Thus the valve 52 will be closed to disconnect the chamber 57 from the atmosphere. After the closing of the valve 52, movement will be transmitted to the hollow piston 100 to move it downwardly and crack the valve 104 to admit pressure from the chamber 102 to the chamber 57 to apply pressure to the trailer brake actuators 60 (FIGURE 1) to snub the trailer brakes. Pressure in the chamber 57 will oppose downward movement of the diaphragm 66.

The lower portion of the electro-magnetic device 115 acts as a pressure regulator to determine the pressure built up in the chamber 139 and consequently, in the pipe 70 to limit the pressure supplied to the chamber 68. Pressure in the chamber 139 acts downwardly on the piston 137, opposed by the loading of the spring 150, and the loading of this spring is determined in accordance with the load being carried by the trailer. The electromagnetic device 115 is carried by the body of the trailer and is movable downwardly relative to the axle as vehicle loads increase. Such downward movement causes the arm 148 to swing in a counter-clockwise direction about the pivot 146 to increase the loading of the spring 150 and thus increase the pressure which must be built up in the chamber 139 to move the piston 137 downwardly.

When the solenoid 115 is energized, the armatures 118 and 119 are attracted toward each other, overcoming the spring 130. Due to the spring 129, the valve 140 will seat first, after which, further movement is only possible by armature 119 moving upwardly. Thus the valve 125 opens to admit air under pressure into the chamber 139. The gap between the armatures 118 and 119 will be closed. As pressure in the chamber 139 is built up, the piston 137 moves downwardly until the valve 125 is in lap position, thus maintaining a pressure in the chamber 139 according to the force of the spring 150. If the piston 137 tends to move downwardly too far, it will crack the valve 140 to release pressure from the chamber 139 to the atmosphere. Thus, it will be apparent that the pressure built up in the chamber 139 will be directly related to the load being carried by the trailer.

Pressure admitted into the chamber 68 closes the valve 52 to disconnect the chamber 57 from the atmosphere and opens the valve 104 to admit fluid under pressure from the chamber 102 to the chamber 57, and this pressure fluid is supplied through the line 59 to the trailer brake actuators. Thus the trailer brake will be snubbed. Assuming that very slight movement of the treadle has taken place and no pressure is admitted to the service line, the tractor brake actuators will not operate, and atmospheric pressure, or close to atmospheric pressure, will be maintained in the chamber 56. Thus very slight movement of the treadle may be used to snub the trailer brakes without appreciable operation of the tractor brakes, and the degree to which the trailer brakes are snubbed will depend upon the loading of the vehicle and not on the extent of movement of the treadle 18.

It will be apparent that pressure supplied to the chamber 57 and thus to the trailer brakes will be controlled by pressure admitted to the chamber 68. When pressure admitted to the chamber 57 reaches a predetermined point, this pressure acts upwardly on the movable structure 48, 49, thus moving the structure upwardly against the pressure in the chamber 68. As this structure moves upwardly, the spring 101 will move the piston 100 upwardly to close the valve 104, at which time the valves 52 and 104 will be in lap position. Any tendency for the pressure in the chamber 57 to rise above the predetermined point necessary to lap the valves referred to will move the structure 48, 49 slightly upwardly to crack the valve 52 to release a little pressure from the chamber 57, whereupon the lap position of the valves 52 and 104 will be re-established.

If it is desired to go beyond the snubbing of the trailer brakes and apply the tractor brakes, movement of the treadle 18 will be continued. Downward movement of the yoke 29 is limited and further movement of the treadle 18 would result in the sliding of the plate 25 between the friction shoes 28. The valve 15 will be operated to admit pressure from the reservoir 10 through pipe 14 and pipe 20 to operate the tractor brakes, and pressure will build up in the service line 63. After a short interval of time, there will be a building up of pressure in the chamber 56 to oppose pressure in the chamber 57. When pressure in the rear end of the service line 63 reaches the pressure present in the chamber 68, there will be equal pressures in the chambers 56 and 58. Thereafter, the diaphragm 66 will be immobilized and will merely rest against the cover 67. The pressure in the chamber 57 will now be controlled by pressure in the chamber 56, and the trailer brake actuators will be supplied with pressure equal to that supplied to the tractor brake actuators 21. The controlling of the tractor brakes will then be taken over in accordance with service line pressure as determined by the operation of the valve 15.

The point at which pressure in the chamber 56 takes over the controlling of pressure in the chamber 57 will be dependent upon pressure in the chamber 68 which, in turn, is dependent upon the loading of the vehicle. For example, referring to FIGURE 3, assuming that the trailer brakes are initially applied by operation of the treadle, there will be an abrupt rise in pressure in the trailer brakes from the point 155 to the point 156, after which there will be an increase in trailer brake pressure but at a lower rate, as the pressure in chamber 56 is increased, as indicated by the line 157. The gradual increase in pressure as indicated by the line 157 will be due to the differential areas between the diaphragm 48 and 66. The point 158 will be reached when pressures in the chambers 56 and 68 are equal, and beyond this point the controlling of the trailer brakes will take place in accordance with pressure in the chamber 56. If the trailer body is more heavily loaded, the higher pressure admitted to the chamber 68 will effect an abrupt rise in pressure from the point 155, for example, to the point 160, for example, after which the trailer brake pressures will increase as indicated by the line 61. Under such load conditions, pressures in the chambers 56 and 68 will become equal at the point 162, after which the trailer brakes will be controlled in accordance with operation of the valve 15 and pressure in the chamber 56.

Thus with the simple addition of the control means associated with the chambers 56 and 68, initial snubbing of the trailer brakes will take place instantaneously upon initial operation of the treadle 18, and the functioning of the electro-magnetic valve device 115 determines what initial snubbing action of the trailer brakes will take place and the pressures at which operation of the trailer brakes will be taken over by the valve 15.

In the retractile movement of the parts, the initial releasing of the treadle 18, through the friction shoes 28, will release the switch 34, the remaining movement of the treadle 18 back to normal position taking place with the plate 25 sliding between the shoes 28.

Upon the releasing of the switch 34, the stop light circuit will be broken together with the circuit through the solenoid 117. The armature 119 will be released for return movement of the valve 125 to closed position, if this valve is not already closed. The armature 118 will be released for upward movement to open the valve 140. Thus air will be exhausted from the chamber 68 through the line 70, chamber 139 and air port 138. The returning of the parts of the valve mechanism 15 to normal position opens the lines 20 and 63 to the atmosphere, thus exhausting pressure from the chamber 56. Under such conditions, the air valve 52 will be opened and the valve 104 will be closed. Thus all of the parts return to their normal positions and normal conditions will be re-established. During such operation, brake actuator pressures will descend along the same lines indicated in FIGURE 3 until the zero pressure point 155 is reached.

It will be apparent that the double-lipped seal 84 acts to prevent the escape of pressure therearound upwardly from the chamber 92. However, this seal acts as a downwardly opening check valve, and when pressure in the reservoir 95, and accordingly in the chamber 92, is below pressure in the chamber 85, the seal 84 permits the escape of fluid from the chamber 85 to the chamber 92 to replenish pressure in the reservoir 95. This reservoir, accordingly, will be maintained under the same pressure as the reservoir 10.

Pressures acting upwardly and downwardly in the chamber 92 are substantially equal. Pressure in the chamber 85 acting downwardly on the shoulder of the piston extension 82 in the chamber 85 biases the piston 76 downwardly to its limit of movement in engagement with the plate 77. If the pressure in the emergency line 87 drops to a dangerous level for any reason, the spring 80 pushes the piston 76 upwardly and the tubular piston 100 will be moved therewith by the spring 101 to close the exhaust valve 52. Slight further movement of the piston 76 will then move the seat 105 away from the valve 104 to admit pressure from the chamber 102 into the chamber 57 to apply the trailer brake. These brakes will be applied fully up to the available pressure in the reservoir 95, thus stopping the vehicle.

From the foregoing it will be apparent that the present system provides simple and efficient means for utilizing initial treadle movement to immediately apply the trailer brakes with the pressure in the actuators thereof being immediately dependent upon the extent to which the vehicle is loaded. The operation of the valve 15 takes over the controlling of the trailer brake actuators after pressure in the chamber 56 is built up, and the point at which this takes place will be determined by pressure in the chamber 68 which, in turn, is determined by the loading of the trailer. It is unnecessary to connect the emergency line to the air reservoir since the seal 84 is utilized as a check valve to maintain the reservoir 95 properly charged at all times. It also will be apparent that if emergency line pressures should fail, the relay valve operates automatically to apply the trailer brakes. The single solenoid 117 is utilized to operate two valves, the exhaust valve 140 being closed and the inlet valve 125 being opened instantly upon energization of the solenoid. In a novel manner also, these valves function in conjunction with the pressure regulator formed by the parts 137, 150 and 148 so that pressure delivered to the trailer brake actuators will be determined in accordance with the loading of the vehicle.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor trailer brake system having tractor brake and trailer brake actuators, a pedal controlled valve for supplying pressure to the tractor brake actuators, and a service line connected to said valve, in combination, an emergency relay valve having a first chamber connected to said trailer brake actuators and a second chamber connected to said service line, an axially movable structure in said relay valve movable by pressure in said second chamber to connect said first chamber to a source of pressure to operate the trailer brakes, said emergency valve having a third chamber, a pressure movable element subject to pressure in said third chamber to operate said axially movable structure, and electro-magnetic means for establishing pressure in said third chamber, such means comprising a solenoid, a circuit adapted to be closed upon initial operation of said control valve for energizing said solenoid, said solenoid having two armatures oppositely movable upon energization of said solenoid, an exhaust valve connected to one armature and normally opening said third chamber to the atmosphere, a normally closed pressure inlet valve connected to the other armature whereby energization of said solenoid will close said exhaust valve and open said inlet valve to supply pressure to said third chamber, and means, including a pressure regulator, for determining the pressure supplied through said inlet valve to said third chamber in accordance with the load on the trailer.

2. In a tractor trailer brake system having tractor brake and trailer brake actuators, a pedal controlled valve for supplying pressure to the tractor brake actuators, a service line connected to said valve, and a stop light on the tractor having a circuit adapted to be closed upon initial operation of said valve, in combination, an emergency relay valve having a first chamber connected to said trailer brake actuators and a second chamber connected to said service line, an axially movable structure in said relay valve including an exhaust valve normally connecting said first chamber to the atmosphere and a normally closed pressure inlet valve, a pressure movable wall between said chambers movable to close said exhaust valve and open said inlet valve, said relay valve having a third chamber, a pressure movable member dividing said second and third chambers and connected to said movable wall, and electro-magnetic means connected to said circuit to be energized simultaneously with said stop light for supplying pressure to said third chamber to operate said pressure-movable member and said movable wall to close said exhaust valve and open said inlet valve, said electro-magnetic means being provided with a pressure regulator adjustable in accordance with loads on the trailer for determining the pressure supplied to said third chamber.

3. In a tractor trailer brake system having tractor brake and trailer brake actuators, a pedal controlled valve for supplying pressure to the tractor brake actuators, and a service line connected to said valve, in combination, an emergency relay valve having a first chamber connected to said trailer brake actuators and a second chamber connected to said service line, an axially movable structure in said relay valve including an exhaust valve normally connecting said first chamber to the atmosphere and a normally closed pressure inlet valve, a pressure movable wall between said chambers movable to close said exhaust valve and open said inlet valve to admit pressure to said first chamber, said relay valve having a third chamber, a pressure movable member dividing said second and third chambers and connected to said movable wall, and electro-magnetic means including a solenoid the coil of which has a circuit adapted to be closed upon initial operation of said pressure controlled valve, said solenoid having two normally spaced armatures movable in opposite directions upon energization of said coil, a normally open exhaust valve connected to one armature and normally opening said third chamber to the atmosphere, a normally closed pressure inlet valve connected to the other armature whereby energization of said coil will close said exhaust valve and open said last-named inlet valve to supply pressure to said third chamber, and control means for determining the pressure supplied to said third chamber through said last-named inlet valve.

4. A system according to claim 3 wherein said control means includes a pressure regulator, for determining the pressure supplied through said last-named inlet valve to said third chamber in accordance with the load on the trailer.

5. A system according to claim 3 wherein said control means includes a body fixed to said solenoid and provided with a control chamber having a pressure valve seat normally engaged by said last-named inlet valve and an exhaust valve seat engageable by said exhaust valve, a pressure responsive member having one end defining said control chamber and carrying said exhaust valve seat, and a spring biasing said pressure responsive member to a normal position toward said last-named exhaust valve and against which said pressure responsive member is movable by pressure in said control chamber, said armatures moving into engagement with each other when said last-named exhaust and inlet valves respectively close and open, thereby being a biasing force tending to move said last-named inlet and exhaust valves toward their seats whereby, when said spring yields under pressure in said control chamber, said last-named inlet valve will seat.

6. A system according to claim 3 wherein said control means includes a body fixed to said solenoid and provided with a control chamber having a pressure valve seat normally engaged by said last-named inlet valve and an exhaust valve seat engageable by said last-named exhaust valve, a pressure responsive member in said body having one end defining said control chamber and carrying said exhaust valve seat, a spring biasing said pressure responsive member to a normal position toward said last-named exhaust valve and against which said pressure responsive member is movable by pressure in said control chamber, and means responsive to increasing weights on the vehicle for increasing the loading of said spring, said armatures moving into engagement with each other when said last-named exhaust and inlet valves respectively close and open, there being a biasing force tending to move said last-named inlet and exhaust valves toward their seats whereby, when said spring yields under pressure in said control chamber, said last-named inlet valve will seat.

7. A system according to claim 3 wherein said control means includes a body fixed to said solenoid and provided with a control chamber having a pressure valve seat normally engaged by said last-named inlet valve and an exhaust valve seat engageable by said last-named exhaust valve, a pressure responsive member in said body having one end defining said control chamber and carrying said exhaust valve seat, a spring biasing said pressure responsive member to a normal position toward said last-named exhaust valve and against which said pressure responsive member is movable by pressure in said control chamber, a movable control element movably connected to said body and engaging an axle of the trailer, said spring being arranged between said movable member and said pressure responsive member to be increasingly loaded as the loading of the trailer increases to increase the pressure in said control chamber necessary for said spring to yield.

8. An emergency relay valve for a tractor-trailer brake system, comprising a body provided with a first control chamber connectible to the trailer brake actuators and a second control chamber connectible to a service line, an axially movable structure arranged axially in said body and open to the atmosphere at one end, an exhaust valve seat carried by the other end of said structure in said first chamber, a movable wall dividing said control chambers and having a normally open exhaust valve engageable with said valve seat, a normally stationary structure surrounding said movable structure and having an inlet valve seat, a normally closed annular inlet valve engaging said inlet valve seat and carried by said movable structure, a first pressure chamber between said structures connected to a source of pressure and open to said first control chamber when said axially movable structure is moved to open said inlet valve, said body having a third control chamber, a pressure movable element dividing said second and third control chambers and connected to said movable wall whereby pressure in said third control chamber will move said exhaust valve into engagement with its seat and move said movable structure to open said inlet valve, and means for admitting pressure to said third control chamber to move said movable structure to admit pressure to said first control chamber and thus to trailer brake actuators until pressure in said second control chamber from service line overbalances said pressure movable element and takes over the controlling of said movable wall and said movable structure, said means for admitting pressure to said third control chamber comprises a solenoid device having an inlet chamber connected to said source of pressure and an outlet chamber connected to said third control chamber, said solenoid device having a winding and two normally spaced armatures, an exhaust valve connected to one armature and arranged in said outlet chamber and normally opening the latter to the atmosphere, and a normally closed pressure inlet valve in said inlet chamber connected to the other armature whereby, when said winding is energized, said armatures move toward each other to close said last-named exhaust valve and open said last-named inlet valve.

References Cited by the Examiner
UNITED STATES PATENTS

| | | | |
|---|---|---|---|
| 2,865,400 | 12/1958 | Stallard | 137—596.16 |
| 2,985,488 | 5/1961 | Stelzer | 303—15 |
| 3,095,246 | 6/1963 | Alfieri | 303—40 |

FOREIGN PATENTS 1,178,386  12/1958  France.

EUGENE G. BOTZ, *Primary Examiner.*